United States Patent
Premerlani et al.

(10) Patent No.: US 7,126,800 B2
(45) Date of Patent: Oct. 24, 2006

(54) METHOD AND SYSTEM FOR COMMUNICATIONS CHANNEL DELAY ASYMMETRY COMPENSATION USING GLOBAL POSITIONING SYSTEMS

(75) Inventors: William J Premerlani, Scotia, NY (US); Bogdan Kasztenny, Markham (CA); Ilia Voloh, Thornhill, CA (US)

(73) Assignee: General Electric Company, Niskayuna, NY (US)

( * ) Notice: Subject to any disclaimer, the term of this patent is extended or adjusted under 35 U.S.C. 154(b) by 594 days.

(21) Appl. No.: 10/605,138

(22) Filed: Sep. 10, 2003

(65) Prior Publication Data

US 2005/0036254 A1  Feb. 17, 2005

Related U.S. Application Data

(60) Provisional application No. 60/481,083, filed on Jul. 11, 2003.

(51) Int. Cl.
*H02H 3/00* (2006.01)
(52) U.S. Cl. ...................................... 361/68
(58) Field of Classification Search .................. 361/68, 361/69
See application file for complete search history.

(56) References Cited

U.S. PATENT DOCUMENTS

| | | | |
|---|---|---|---|
| 4,470,093 A * | 9/1984 | Yamaura | 361/68 |
| 5,809,045 A | 9/1998 | Adamiak et al. | 371/48 |
| 5,875,402 A * | 2/1999 | Yamawaki | 455/502 |
| 5,958,060 A | 9/1999 | Premerlani | 713/400 |
| 6,311,307 B1 | 10/2001 | Adamiak et al. | 714/799 |
| 6,456,947 B1 | 9/2002 | Adamiak et al. | 702/59 |
| 6,618,648 B1 * | 9/2003 | Shirota et al. | 700/291 |
| 6,662,124 B1 | 12/2003 | Schweitzer et al. | |
| 6,678,134 B1 * | 1/2004 | Sugiura et al. | 361/68 |

OTHER PUBLICATIONS

David L. Mills, "Internet Time Synchronization: The Network Time Protocol;" IEEE Transactions on Communications, vol. 39, No. 10, Oct. 1991; pp. 1482-1493.
GE Multilin Releases Channel Asymmetry Compensation Feature for the L90 Line Current Differential Relay, Jul. 2, 2002; GE Multilin, Power Management Lectronics.

* cited by examiner

*Primary Examiner*—Stephen W. Jackson
*Assistant Examiner*—Boris Benenson
(74) *Attorney, Agent, or Firm*—Fletcher Yoder

(57) ABSTRACT

A method for compensating for communications channel delay asymmetry in a current differential protection system includes determining an apparent sampling clock offset for a communications channel, the apparent sampling clock offset between a first sampling clock and a second sampling clock configured within the current differential protection system. An apparent global positioning system (GPS) clock offset is determined for the communications channel, the apparent GPS clock offset between a plurality of GPS time stamps corresponding to the first and said second sampling clocks. A compensated clock offset is determined by subtracting the apparent GPS clock offset from the apparent sampling clock offset so as to cancel out a channel asymmetry component of deviation in the apparent GPS and sampling clock off-sets.

12 Claims, 4 Drawing Sheets

METHOD AND SYSTEM FOR COMMUNICATIONS CHANNEL DELAY ASYMMETRY COMPENSATION USING GLOBAL POSITIONING SYSTEMS

CROSS REFERENCE TO RELATED APPLICATIONS

This application claims the benefit of U.S. Provisional Application No. 60/481,083, filed Jul. 11, 2003 the contents of which are incorporated by reference herein in their entirety.

BACKGROUND OF THE INVENTION

The present disclosure relates generally to clock synchronization of current differential systems and, more particularly, to a method and system for communications channel delay asymmetry compensation using global positioning system measurements.

In recent years, there has been an increased interest in the application of line differential relays to very long power transmission lines by utilities all over the world. This renewed attention to this technique is due, in large part, to the availability of digital differential relays operating over high-speed digital communication channels. The basic operating principle of current differential relaying is to calculate the difference between the currents entering and leaving a protected zone, such that a protection feature is engaged whenever the current difference exceeds a threshold level. Accordingly, line differential relaying requires that the information of the current flowing through each line terminal is made known to all other terminals.

Earlier line differential relays utilized analog communication channels, typically in the form of pilot wires in order to exchange the current values between terminals. The application of an analog line differential scheme over pilot wires was limited to a maximum distance of about 8–10 kilometers, due to several factors such as pilot wire capacitance resistance, extraneously induced voltages (e.g., ground potential rise), etc. On the other hand, the arrival of digital communications allowed relay manufacturers to encode the information exchanged between the relay terminals as logical zeros and ones. Thus, a preferred choice of communication media for digital differential relays has been a direct fiber optic connection, as it provides security and noise immunity.

Many power system monitoring, protection and control functions could be performed more efficiently and accurately if power system digital measurements at multiple locations were synchronized. Generally, such measurements are only somewhat synchronized because of difficulty in accurately synchronizing sampling clocks physically separated by large distances. Conventional uses of digital communications to synchronize sampling clocks at remote locations have accuracies limited by uncertainties in the message delivery time. In particular, digital communications can have different delays in different directions between a pair of locations, which leads to an error in clock synchronization. As such, it is desirable to be able to provide improved clock synchronization at multiple locations, particularly when an asymmetric delay is present in the communication system.

BRIEF DESCRIPTION OF THE INVENTION

The above discussed and other drawbacks and deficiencies of the prior art are overcome or alleviated by a method for compensating for communications channel delay asymmetry in a current differential protection system. In an exemplary embodiment, the method includes determining an apparent sampling clock offset for a communications channel, the apparent sampling clock offset between a first sampling clock and a second sampling clock configured within the current differential protection system. An apparent global positioning system (GPS) clock offset is determined for the communications channel, the apparent GPS clock offset between a plurality of GPS time stamps corresponding to the first and said second sampling clocks. A compensated clock offset is determined by subtracting the apparent GPS clock offset from the apparent sampling clock offset so as to cancel out a channel asymmetry component of deviation in the apparent GPS and sampling clock offsets.

In another aspect, a system for compensating for communications channel delay asymmetry in a current differential protection system includes a first algorithm for determining an apparent sampling clock offset for a communications channel, the apparent sampling clock offset between a first sampling clock and a second sampling clock configured within the current differential protection system. A second algorithm is used for determining an apparent global positioning system (GPS) clock offset for the communications channel, the apparent GPS clock offset between a plurality of GPS time stamps corresponding to said first and said second sampling clocks. A mechanism for computing a compensated clock offset subtracts the apparent GPS clock offset from the apparent sampling clock offset so as to cancel out a channel asymmetry component of deviation in the apparent GPS and sampling clock offsets.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a method and system for communications channel delay asymmetry compensation using global positioning system measurements. Briefly stated, a differential clock offset calculation utilizes two methods for computing clock offset between terminals over a communications link. The first method computes the apparent sampling clock offset from a communications exchange of sampling clock time stamps. The computed offset is equal to the actual offset, plus an error equal to one half of the channel asymmetry. The second method is identical to the first method, except that the time stamps that are exchanged are taken from a global positioning system (GPS) synchronized clock. In this case, the apparent clock offset computed from the second method is equal to one half of the channel asymmetry. The net clock offset is then computed differentially by subtracting the apparent GPS offset from the apparent local clock offset. Thereby, close synchronization is achieved, notwithstanding any asymmetric communications channel time delays.

Figure 1:
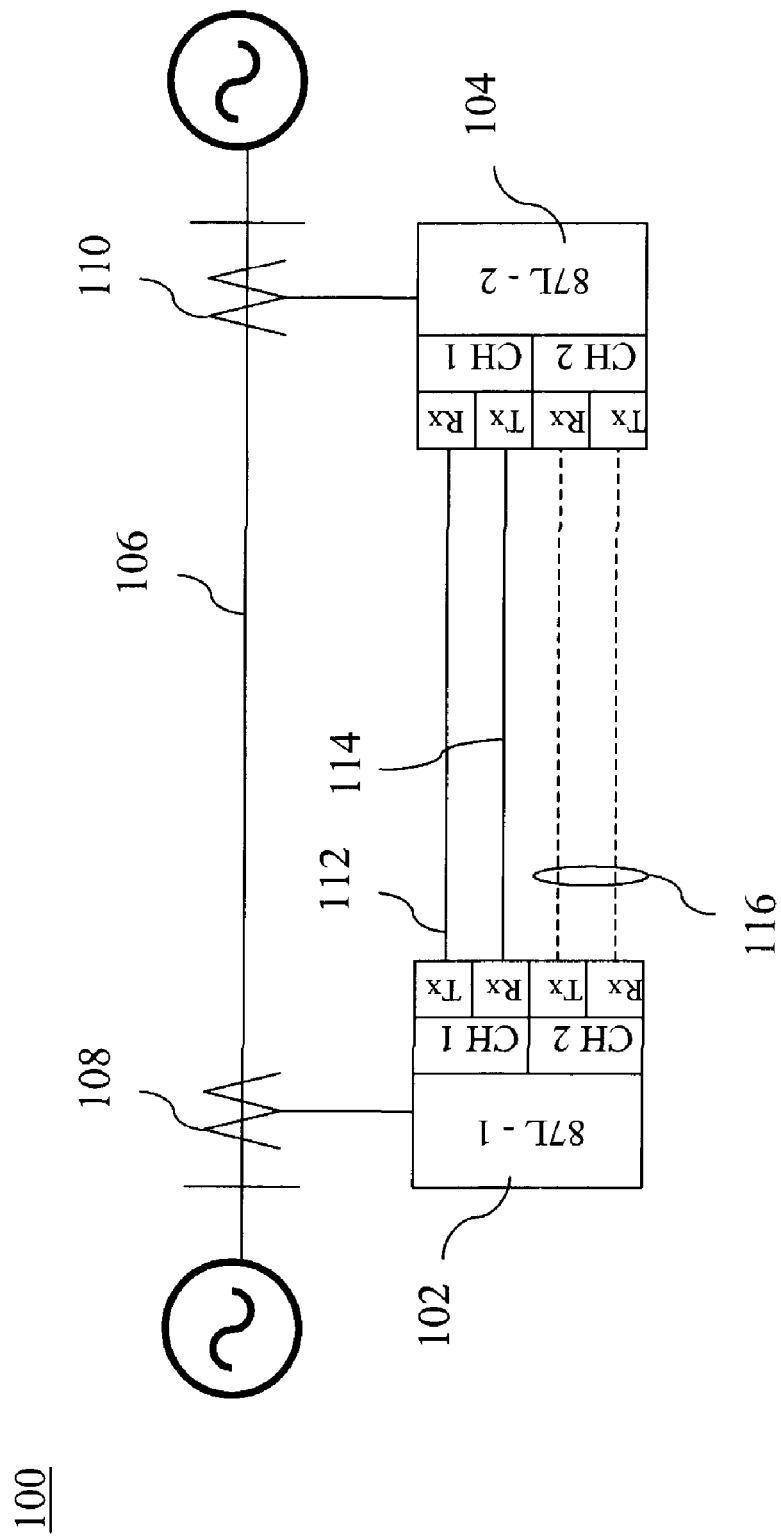
FIG. 1 is a schematic diagram of an exemplary transmission protection, digital current differentiation system suitable for use in accordance with and embodiment of the invention.

Referring initially to FIG. 1, there is shown a schematic diagram of an exemplary transmission protection, digital current differentiation system 100. A pair of current differential relays 102, 104 compare the current entering and leaving the protected circuit (e.g., transmission line 106) through the use of remote current sensing devices 108, 110. A pair of transmitting and receiving communication lines 112, 114, respectively, are used to convey the current information from one relay to another through a primary communication channel (CH 1). Optionally, the system 100 may include a redundant communication channel (CH 2), as indicated by dashed lines 116. Although the current differentiation system 100 is represented in FIG. 1 as a "peer-to-peer" architecture, it will be appreciated that the principles described hereinafter are equally applicable to other transmission protection differentiation architectures, such as a master-slave architecture, for example.

In the case of a line differential scheme, these currents are relatively far apart from each other and thus the currents measured by a relay at one terminal have to be moved to the other terminal in order to make the comparison. Moreover, in order to evaluate the differential function, these current samples have to be taken at the same time on both terminals. This in turn requires that relay clocks be synchronized since any time difference between the relays' clocks will translate into a differential current that may cause a relay to misoperate.

Figure 2:
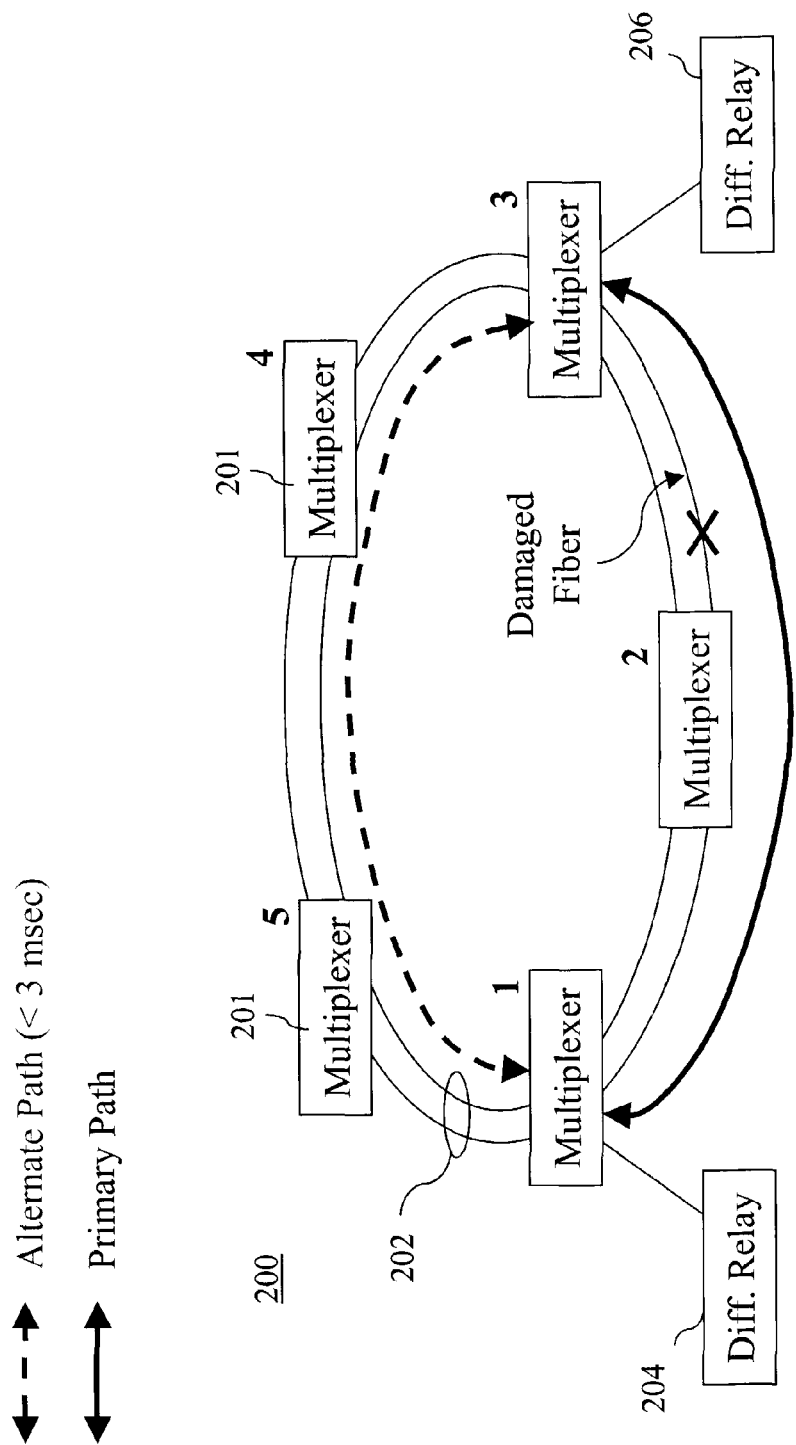
FIG. 2 is a schematic diagram which illustrates an exemplary problem concerning asymmetrical channel delay over a SONET (Synchronous Optical Networks)/SDH (Synchronous Digital Hierarchy) system.

There are two well-established, similar standards for optical multiplexers. One of those is SONET (Synchronous Optical Networks), mainly used in North America, while the other is SDH (Synchronous Digital Hierarchy) as defined by the ITU (International Telecommunications Union), and used in the rest of the world. As shown in FIG. 2, a SONET/SDH optical network 200 is generally characterized by a ring topology in which various nodes 201 are connected by a pair 202 of fibers, one for transmitting (Tx) and the other for receiving (Rx). The traffic between any two nodes on the network is usually carried over the shortest fiber path. In addition, there is an alternate (backup) communication path on the complement of the ring.

Under normal operating conditions, a first relay 204 at node (multiplexer) 1 communicates with a second relay 206 at node 3 via node 2 and vice versa. Thus, the communications delays for both the transmit path and the receive path are generally the same. In this situation, the channels are said to be "symmetric", meaning that the transmission and receiving paths have equal propagation delays. Because of its ring topology, the SONET/SDH networks have some unique features, including "self-healing" capabilities. Upon a failure of either the Tx or Rx signal, utility grade optical multiplexers have a special built-in function called "switch on yellow" that automatically switches both Tx and Rx channels over the alternate communication path, thereby achieving a new symmetrical operation condition. This switching takes place in a very short time (e.g., 3 milliseconds), and is transparent to the line differential schemes such that no further action or special algorithms are needed in the relay to compensate for asymmetry.

On the other hand, utilities without any fiber optic infrastructure will lease digital channels from telecom companies. Unfortunately, there is no guarantee as to the path of data messages within the leased network and the communications time delays, since the links are no longer under the direct management and supervision of the power utility. This is also the case where the utility uses non-utility grade multiplexers, since they generally do not support the "switch on yellow" function described above.

As also shown in FIG. 2, it will now be assumed that only the receiving channel between multiplexer 2 and multiplexer 3 has failed. Under these conditions, the SONET/SDH based network will automatically switch over the alternate path route and messages sent from the second relay 206 to the first relay 204 will travel through multiplexers 3-4-5-1 instead of 3-2-1. This condition is also referred to as a split path communication. Because of this longer path, the Rx delay increases significantly. In other words, this new configuration now features asymmetrical communication channel delays, since the time delay for the Tx signal is different from that of the Rx signal. This channel delay asymmetry can be as high as 10–20 milliseconds (ms), depending on the particular routing and length of the alternate path.

In turn, the channel asymmetry causes incorrect synchronization between the first and second relays, while a conventional clock synchronization scheme operates based on the assumption that transmit-receive delays are equal to one another. The result is a fictitious differential current, proportional to twice the trigonometric sine of half the value of the channel asymmetry (in radians), at the power system frequency. Furthermore, if the currents and channel asymmetry are high enough, the relay will malfunction. Accordingly, for these split path situations, a special mechanism should be built into the relays in order to cope with the differences between the transmit-receive paths.

Heretofore, the synchronization of the relay clocks and calculation of the propagation delay using communications channels with symmetric delays has been relatively easy to accomplish using exchanges of timing information. Line differential relays operating on a split path present a more difficult task since, if not compensated for the different communication delays, the relays will have their clocks remain synchronized, the samples therefrom not taken at the same time, and as a result the differential function will malfunction even for steady state conditions.

Accordingly, a key feature for a differential relay to achieve very high sensitivity is the use of synchronized sampling. Generally stated, differential current is computed as the total of the phasor currents measured at the same time at all terminals. The system sensitivity is ultimately limited by the accuracy of phasor measurements. A preferred manner of eliminating errors due to time misalignment is to construct each phasor from a set of instantaneous current samples taken at precisely the same time at all terminals in the system by synchronized sampling clocks. Each terminal has a sampling clock that controls both the precise time when current samples are measured and the assignment of phasor coefficients to each sample. The clocks are then synchronized to within a few microseconds of each other. This assures that differential measurements are not contaminated by time misalignment errors.

One technique for achieving symmetric clock synchronization is a method for determining clock offsets between clocks at different locations, which uses four time stamps gathered in a round trip communications exchange, and is further described by David L. Mills in a paper on Internet time synchronization entitled "Internet Time Synchronization: The Network Time Protocol," IEEE Transaction on Communications, vol. 39, no. 10, pp. 1482–1492, October 1991, the contents of which are incorporated herein by reference. The algorithm discussed therein is described as a "ping-pong" calculation, since the manner in which the timing information is exchanged is reminiscent of a game of ping-pong.

Figure 3:
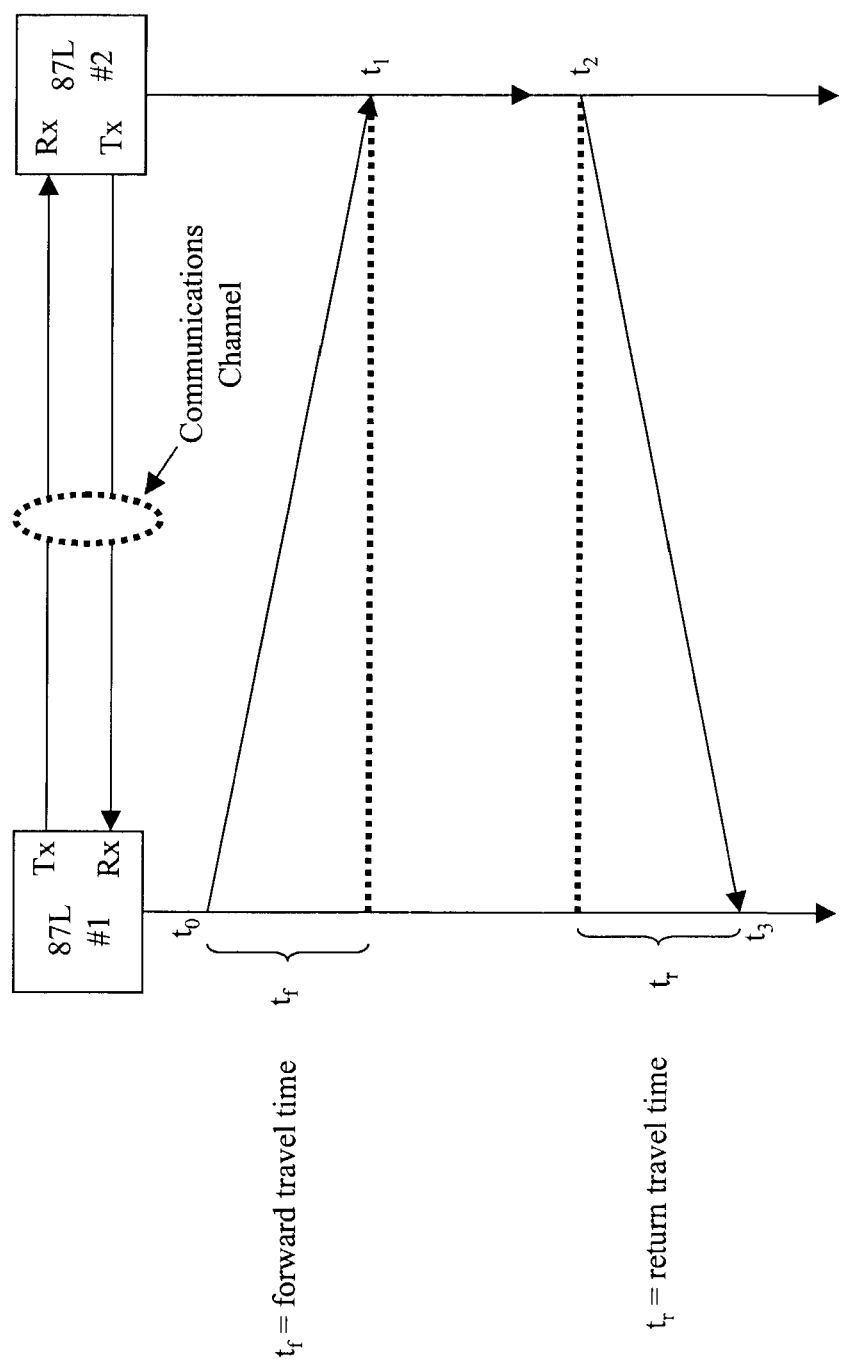
FIG. 3 is a schematic diagram which illustrates the determination of channel delay offset in accordance with the "ping-pong" technique.

As illustrated in FIG. 3, the "ping-pong" algorithm computes the clock offset from four time measurements collected during a round trip pair of messages. Once the nodes are synchronized, the "ping-mechanism continues to exchange round trip messages between nodes on the network to maintain synchronism. However, the algorithm assumes that the communications channel delay is the same in each direction. If this is not the case, the timing error is equal to one half of the difference between the delays in each direction; but, accurate current differential measurements require both relays to be in time synchronization for differential calculations.

The amount of time synchronization error depends on the accuracy of the local clocks, how often the "ping-pong" is executed, channel delay, and other factors. The "ping-pong" function must be executed often enough to compensate for the drift in the local clocks, which are moderately accurate crystal clocks. A small amount of channel delay itself is not critical; it mainly affects only system transient response, provided the channel delay is the same in each direction. If it is not the same, however, the difference between the delays causes a differential error between the clocks being synchronized over the channels.

Previously, upon the occurrence of a channel asymmetry condition (and if no special means is provided to detect the same), the sampling clocks will start to drift apart at a speed defined by the value of asymmetry and coefficients of the phase and frequency locked loop. Thus, a malfunction may occur wherein the higher the channel asymmetry, the higher the apparent differential current appearing on the relay, causing conventional line current differential system to malfunction. Generally, depending on the 87 L settings, a conventional line current differential system can tolerate up to about 1.5–2.0 ms of asymmetry without degradation of sensitivity. Above that value, it is undesirable to operate 87 L relays without a dedicated algorithm to cope with split path conditions.

Figure 4:
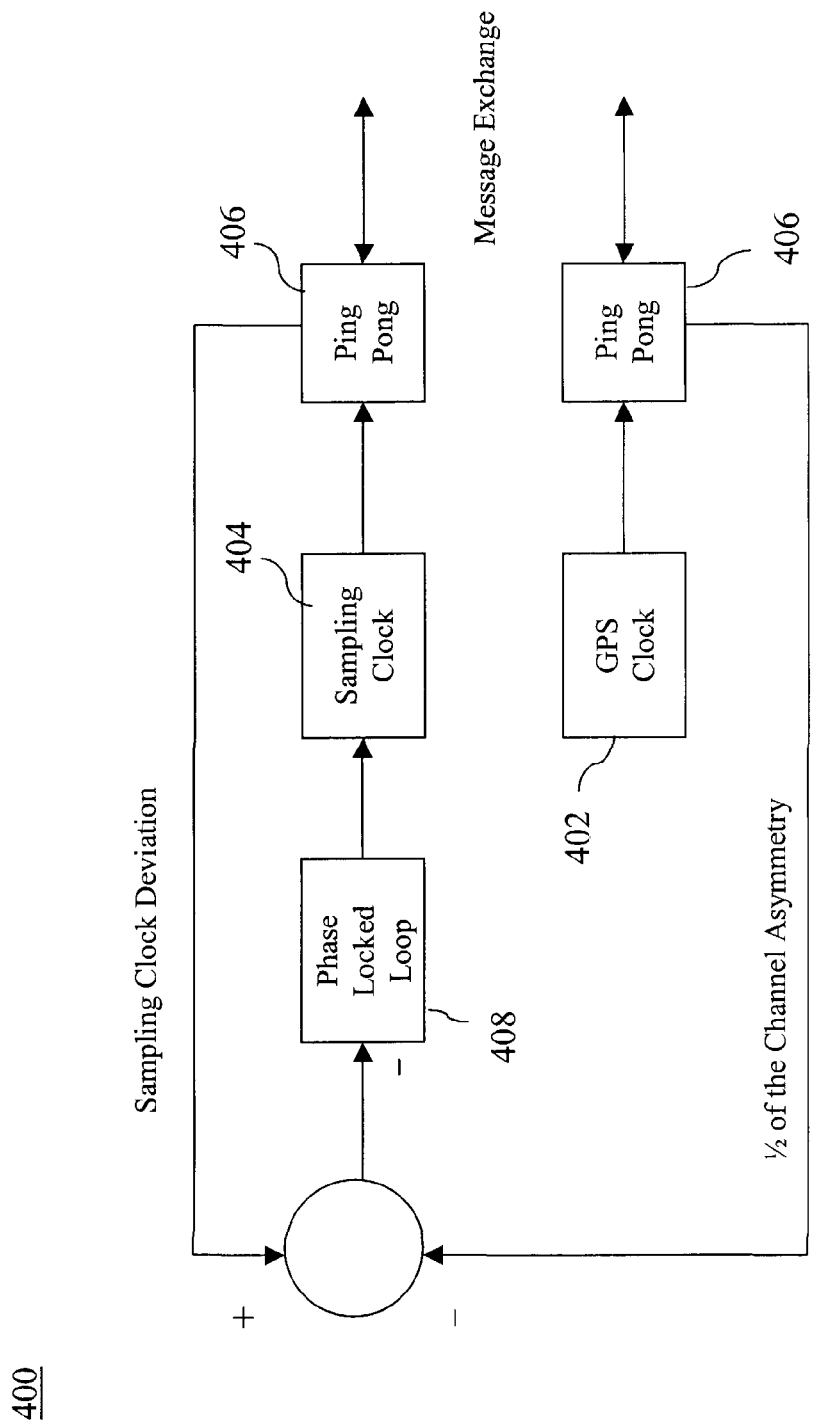
FIG. 4 is a block diagram illustrating a method and system for communications channel delay asymmetry compensation using global positioning system measurements, in accordance with an embodiment of the invention.

Accordingly, FIG. 4 is a block diagram 400 illustrating a method and system for communications channel delay asymmetry compensation using global positioning system measurements, in accordance with an embodiment of the invention. As can be seen, the system further utilizes global positioning system (GPS) technology as a convenient way to compensate for the asymmetry. More particularly, the system 400 utilizes a second set of time stamps, taken from GPS synchronized clocks 402 instead of the sampling clocks 404, and computes an apparent clock offset from the GPS time stamps using the same (but independent) "ping-algorithm 406. Since the actual GPS clock offset is practically zero, the offset computed by the algorithm arises entirely from the channel asymmetry. By gathering the GPS time stamps at the same time as the sampling clock time stamps are taken, it is possible to exactly compensate for each message exchange, even if the asymmetry is dynamically changing.

The sampling clock 404 deviation is computed from four time stamps from the local sampling clocks in a pair of exchanged messages, each using an independent ping-pong algorithm. Specifically, the computed deviation is equal to the actual deviation plus one half of the channel asymmetry. One half of the channel asymmetry for the pair of messages is computed using the same ping-pong algorithm, with four additional time stamps taken from the local GPS clocks. The deviation computed from the GPS time stamps is equal to one half of the channel asymmetry, which is then subtracted from the computed sampling clock deviation. The compensated deviation is then used to drive the phase locked loop. Asymmetry is subtracted at the input of a phase locked loop 408 rather than the output, in order for the loop to correctly track transients. In addition, both the sampling clock time stamps and the GPS time stamps are triggered from the same events.

In the exemplary embodiment depicted, each sampling clock in the system is driven by a hybrid phase-frequency locked loop 408 with inputs for both the phase deviation (local clock offset) and the frequency deviation of the local clock with respect to the power system frequency. It should be appreciated, however, that this system is equally applicable to those systems in which frequency tracking is not implemented. There is also an optional input for GPS based compensation of channel asymmetry. The filter in each loop is a simple, linear, proportional plus integral controller that drives both the phase deviation(s) and the frequency deviation to zero. The weight of phase deviation is larger than the weight of frequency deviation in the controller, meaning that phase deviation has a higher priority and is suppressed much faster than frequency deviation.

The basic approach to frequency locking is to compute frequency deviation from the apparent rotation of phasors in the complex plane, and adjust the sampling frequency accordingly. The rotational rate of phasors is equal to the difference between the power system frequency and the ratio of the sampling frequency divided by the number of samples per cycle. This difference is used to correct the sampling clocks to synchronize the sampling with the power system frequency. Synchronizing the frequency of the sampling clocks to the power system improves the rejection of non-fundamental frequency components that would otherwise leak into the measurement of fundamental frequency voltages and currents eliminating the error effects of asynchronous sampling.

The phase deviation between each pair of terminals is computed using the "ping-pong" algorithm. Half of the deviation is allocated to each terminal in a two terminal system. If the communications system is symmetric, the computed phase deviation is equal to the actual deviation. However, if there is channel asymmetry, the computed total clock deviation is equal to the actual deviation, plus one half of the difference between the communication delays in each direction.

With this scheme, whenever the channel asymmetry changes, it shows up in both the uncompensated clock phase deviation and the estimate of one half of the channel asymmetry at the same time. Compensating the estimate of the sampling clock deviation by subtracting the estimate of one half of the channel asymmetry thereby produces a true measure of the sampling clock phase deviation.

Again, in order to yield the best transient response, it is preferable that both the sampling clock time stamps and the GPS clock time stamps be triggered from the same events. One implication of this embodiment is that every set of sampling clock time stamps should be accompanied by a corresponding set of GPS clock time stamps. Because of bandwidth limitations, it may be necessary to transmit the complete collection of time stamps half as frequently as for the uncompensated scheme. As a consequence, the amount of noise in the output of the phase locked loops will be multiplied by the square root of 2.

There is consequence of frequency tracking that should be also taken into account in the compensation. The local sampling clock is locked to the power system frequency, thus it measures time in electrical angles at the power system frequency. In contrast, the GPS clock measures absolute time. Prior to compensation, the channel asymmetry as measured from GPS absolute time stamps should be therefore be converted to the same basis as the sampling clock by taking into account the actual frequency of the sampling clock.

As will be appreciated, the above described asymmetrical compensation scheme allows for exact channel asymmetry is compensation, even after an immediate change in symmetry. Furthermore, since channel asymmetry is measured directly, compensation can be continued for a while subsequent to loss of GPS. The algorithm to compute the asymmetry from GPS time stamps is similar to the present implementation of the ping-pong algorithm, the existing code may be used.

In the event that a GPS clock fails or a GPS signal is lost at one or more terminals, one or more backup plans that advantage of the stability of the local sampling clocks can be utilized. For example, if a GPS clock fails or if a GPS signal is lost, the adjustment of the sampling clock frequency at all terminals can be stopped. At the instant of GPS failure, all sampling clocks may be tightly synchronized to each other in both phase angle and frequency. Subsequent to a loss of GPS, assuming communications are still intact, current differential protection may still be provide for up to about 10 seconds, during which time the synchronization error will be no greater than about 250 microseconds. Then, after 10 seconds, or if communications fail, a backup distance protection function may be utilized.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for compensating for communications channel delay asymmetry in a current differential protection system, the method comprising:
   determining an apparent sampling clock offset for a communications channel, said apparent sampling clock offset between a first sampling clock and a second sampling clock configured within the current differential protection system;
   determining an apparent global positioning system (GPS) clock offset for said communications channel, said GPS clock offset between a plurality of GPS time stamps corresponding to said first and said second sampling clocks; and
   determining a compensated clock offset by subtracting said apparent GPS clock offset from said apparent sampling clock offset so as to cancel out a channel asymmetry component of deviation in said apparent GPS and sampling clock offsets.

2. The method of claim 1, wherein said cancelled channel asymmetry component of deviation represents half of the actual channel asymmetry.

3. The method of claim 1, further comprising:
   inputting said compensated clock offset into a phase locked loop;
   wherein an output of said phase locked loop is used to synchronize said first and second sampling clocks.

4. The method of claim 3, wherein said phase locked loop further comprises a frequency-phase locked loop.

5. The method of claim 3, wherein said sampling clock offset and said GPS clock offset are determined using a ping-pong algorithm.

6. The method of claim 5, further comprising converting said apparent GPS clock offset to a power system frequency associated with said first and second sampling clocks.

7. A system for compensating for communications channel delay asymmetry in a current differential protection system, comprising:
   a first algorithm for determining an apparent sampling clock offset for a communications channel, said apparent sampling clock offset between a first sampling clock and a second sampling clock configured within the current differential protection system;
   a second algorithm for determining an apparent global positioning system (GPS) clock offset for said communications channel, said apparent GPS clock offset between a plurality of GPS time stamps corresponding to said first and said second sampling clocks; and
   a mechanism for computing a compensated clock offset by subtracting said apparent GPS clock offset from said apparent sampling clock offset so as to cancel out a channel asymmetry component of deviation in said apparent GPS and sampling clock offsets.

8. The system of claim 7, wherein said cancelled channel asymmetry component of deviation represents half of the actual channel asymmetry.

9. The system of claim 7, further comprising:
   a phase locked loop having said compensated clock off-set as an input thereto;
   wherein an output of said phase locked loop is used to synchronize said first and second sampling clocks.

10. The system of claim 9, wherein said phase locked loop further comprises a frequency-phase locked loop.

11. The system of claim 9, wherein said first and second algorithms further comprise a ping-pong algorithm.

12. The system of claim 11, wherein said apparent GPS clock offset is converted to a power system frequency associated with said first and second sampling clocks.

* * * * *